(12) United States Patent
Bostick et al.

(10) Patent No.: US 11,170,779 B2
(45) Date of Patent: *Nov. 9, 2021

(54) VISUALIZATION OF AUDIO ANNOUNCEMENTS USING AUGMENTED REALITY

(71) Applicant: International Business Machines Corporation, Armonk, NY (US)

(72) Inventors: James E. Bostick, Cedar Park, TX (US); John M. Ganci, Jr., Raleigh, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/663,728

(22) Filed: Oct. 25, 2019

(65) Prior Publication Data

US 2020/0058303 A1 Feb. 20, 2020

Related U.S. Application Data

(63) Continuation of application No. 16/361,621, filed on Mar. 22, 2019, now Pat. No. 10,553,217, which is a
(Continued)

(51) Int. Cl.
*G02B 27/01* (2006.01)
*G06T 19/00* (2011.01)
(Continued)

(52) U.S. Cl.
CPC .............. *G10L 15/26* (2013.01); *G02B 27/01* (2013.01); *G06T 19/006* (2013.01);
(Continued)

(58) Field of Classification Search
CPC ........ G02B 27/01; G06T 19/006; G10L 15/26
See application file for complete search history.

(56) References Cited

U.S. PATENT DOCUMENTS

| 7,440,900 B2 | 10/2008 | Chang |
| 8,286,070 B2 | 10/2012 | Merril et al. |

(Continued)

FOREIGN PATENT DOCUMENTS

WO 01/92910 A2 12/2001

OTHER PUBLICATIONS

Dragon speech recognition—Transcription Software—Nuance, "Powerful transcription that's ready for work", http://www.nuance.com/dragon/transcription-solutions/index.htm, Printed Feb. 24, 2016, 4 pages.

(Continued)

*Primary Examiner* — Bryan S Blankenagel
(74) *Attorney, Agent, or Firm* — Daniel Yeates; Madeline F. Schiesser; Keohane & D'Alessandro, PLLC

(57) ABSTRACT

Approaches presented herein enable communication of audio messages using augmented reality. More specifically, a set of captured messages are analyzed to determine, for each message of the set of messages, whether the message is relevant to a user. At least one message of the set of messages is associated with a real-world object over which to display the at least one message in an augmented reality environment. A time limit is assigned to the at least one message based on the analyzed relevance to the user. In the case that a current time is within the time limit, the at least one message is displayed on a display of a mobile device associated with the user when a camera of the mobile device is directed at the real-world object associated with the at least one message.

20 Claims, 4 Drawing Sheets

Related U.S. Application Data continuation of application No. 15/151,606, filed on May 11, 2016, now Pat. No. 10,339,933.

(51) Int. Cl.
    *G10L 15/26*     (2006.01)
    *H04L 12/58*     (2006.01)
    *H04L 12/18*     (2006.01)

(52) U.S. Cl.
    CPC ...... *H04L 12/1845* (2013.01); *H04L 12/1895* (2013.01); *H04L 51/046* (2013.01); *H04L 51/066* (2013.01); *H04L 51/14* (2013.01); *H04L 51/20* (2013.01)

(56) References Cited

U.S. PATENT DOCUMENTS

| | | | |
|---|---|---|---|
| 8,731,919 B2 | 5/2014 | George | |
| 8,965,460 B1 | 2/2015 | Rao et al. | |
| 9,361,353 B1 | 6/2016 | Aristides | |
| 10,572,681 B1* | 2/2020 | Murphy | H04L 9/088 |
| 2006/0074671 A1 | 4/2006 | Farmaner et al. | |
| 2006/0229088 A1 | 10/2006 | Walter | |
| 2007/0124395 A1 | 5/2007 | Edge et al. | |
| 2007/0275700 A1 | 11/2007 | Agrawal et al. | |
| 2008/0001780 A1 | 1/2008 | Ohno et al. | |
| 2008/0208851 A1 | 8/2008 | Briggs et al. | |
| 2011/0137551 A1 | 6/2011 | Peri | |
| 2011/0225257 A1 | 9/2011 | Tilden et al. | |
| 2011/0252101 A1 | 10/2011 | Davis et al. | |
| 2012/0035925 A1 | 2/2012 | Friend et al. | |
| 2012/0072249 A1 | 3/2012 | Weir et al. | |
| 2012/0096403 A1 | 4/2012 | Jung et al. | |
| 2012/0209842 A1 | 8/2012 | Bettridge et al. | |
| 2012/0226647 A1 | 9/2012 | Murray et al. | |
| 2012/0310396 A1 | 12/2012 | Ojanpera | |
| 2013/0286206 A1 | 10/2013 | Ozaki et al. | |
| 2013/0300759 A1 | 11/2013 | White | |
| 2014/0064511 A1 | 3/2014 | Desai | |
| 2014/0067649 A1 | 3/2014 | Kannan et al. | |
| 2014/0079225 A1 | 3/2014 | Jarske et al. | |
| 2014/0115468 A1 | 4/2014 | Guerrero | |
| 2014/0180735 A1 | 6/2014 | Holm et al. | |
| 2014/0188669 A1 | 7/2014 | Freeman et al. | |
| 2014/0282144 A1* | 9/2014 | Maciocci | G06F 3/0481 |
| | | | 715/765 |
| 2014/0310595 A1 | 10/2014 | Acharya et al. | |
| 2014/0337477 A1* | 11/2014 | Fisher | G06T 7/70 |
| | | | 709/219 |
| 2014/0372154 A1 | 12/2014 | Scott | |
| 2014/0375683 A1 | 12/2014 | Salter et al. | |
| 2015/0039640 A1 | 2/2015 | Garrett | |
| 2015/0066919 A1 | 3/2015 | Park et al. | |
| 2015/0149220 A1 | 5/2015 | Omar | |
| 2015/0279356 A1 | 10/2015 | Lee | |
| 2016/0019895 A1 | 1/2016 | Poisner | |
| 2016/0117618 A1 | 4/2016 | Wang et al. | |
| 2016/0212552 A1 | 7/2016 | Schneider et al. | |
| 2017/0039853 A1 | 2/2017 | Chambers et al. | |
| 2017/0076753 A1 | 3/2017 | Vouin et al. | |
| 2017/0115837 A1* | 4/2017 | Drouin | G06F 3/0482 |
| 2017/0161382 A1* | 6/2017 | Ouimet | G11B 27/34 |
| 2017/0213552 A1 | 7/2017 | Gupta et al. | |
| 2017/0330585 A1 | 11/2017 | Bostick et al. | |
| 2018/0239136 A1* | 8/2018 | Ishikawa | G02B 27/0179 |
| 2018/0275749 A1* | 9/2018 | Yoon | G02B 27/01 |

OTHER PUBLICATIONS

Bryan S. Blankenagel, U.S. Appl. No. 15/151,606, Office Action, dated Jan. 13, 2017, 30 pages.
Bryan S. Blankenagel, U.S. Appl. No. 15/151,606, Final Office Action, dated May 18, 2017, 31 pages.
Bryan S. Blankenagel, U.S. Appl. No. 15/151,606, Office Action, dated Nov. 13, 2017, 34 pages.
Bryan S. Blankenagel, U.S. Appl. No. 15/151,606, Final Office Action, dated Apr. 3, 2018, 29 pages.
Bryan S. Blankenagel, U.S. Appl. No. 15/151,606, Office Action, dated Sep. 11, 2018, 31 pages.
Bryan S. Blankenagel, U.S. Appl. No. 15/151,606, Notice of Allowance, dated Jan. 31, 2019, 12 pages.
Bryan S. Blankenagel, U.S. Appl. No. 16/361,621, Notice of Allowance, dated Sep. 25, 2019, 23 pages.

\* cited by examiner

VISUALIZATION OF AUDIO ANNOUNCEMENTS USING AUGMENTED REALITY

RELATED U.S. APPLICATIONS

This patent document is a continuation of, and claims the benefit of, co-pending and co-owned U.S. patent application Ser. No. 16/361,621, filed Mar. 22, 2019, which is a continuation of commonly owned U.S. patent application Ser. No. 15/151,606, filed May 11, 2016, issued Jul. 2, 2019 as U.S. Pat. No. 10,339,933.

TECHNICAL FIELD

This invention relates generally to communications and, more specifically, to using augmented reality to present announcements.

BACKGROUND

Many public areas, including public transportation services, rely on audio announcements to convey information to a public. For example, a transportation service, such as a train or bus station, an airport, or a metro, may broadcast announcements over a speaker system. Often, announcements are broadcast in a particular vicinity related to the content of the announcement. For example, boarding announcements made from or related to Gate 1 are usually only broadcast in the local vicinity near Gate 1. Further, some announcements may directly relate to a specific person, for example a request for that person to come to a specific gate. However, a person may miss an announcement that was intended for the person to hear, for example, because the person is at a different location, hearing impaired, distracted, or because the announcement cannot be heard over other sounds in the vicinity.

U.S. Pat. No. 8,286,070 discloses: "captur[ing] media assets of live presentations comprising a session, including image data of sequentially presented visual aids accompanying the live presentations and audio data."

U.S. Pat. No. 8,731,919 discloses: "[a] recorder to capture audio speech from at least one [ ] devices, the recorder stores [ ] audio speech as data in [a] database system, and [a] recognition engine subsequently retrieves the audio speech data, transcribes the audio speech data into text, and stores the text and data associating the text data with at least the audio speech data in the database system for subsequent retrieval by a search application.

U.S. Patent Application Publication 2012/0035925 discloses: "automatic capture and population of task and list items in an electronic task or list surface via voice or audio input through an audio recording-capable mobile computing device".

U.S. Patent Application Publication 2011/0252101 discloses: "delivering communications associated with delivery conditions in which the occurrence of the delivery condition is determined by monitoring information received from a plurality of sources via multiple communication channels."

U.S. Pat. No. 7,440,900 discloses: "a distributed data processor access[ing] [ ] voice messages and extract[ing] desired information from the voice messages. The data processor then augments the data stored in the voice message data store with the extracted information. [A] user interface component provides user access to the voice messages with the augmented data."

WIPO International Patent Application WO/2001/092910 discloses: "determining the locations of a plurality of users within a predetermined space" by "allocating an electronic tag having an identifier to each user, each tag being responsive to a predetermined interrogation signal to transmit a response signal from which the location of the tag within the predetermined space can be determined."

SUMMARY

In general, embodiments described herein provide for communicating audio messages using augmented reality. More specifically, a set of captured messages are analyzed to determine, for each message of the set of messages, whether the message is relevant to a user. At least one message of the set of messages is associated with a real-world object over which to display the at least one message in an augmented reality environment. A time limit is assigned to the at least one message based on the analyzed relevance to the user. In the case that a current time is within the time limit, the at least one message is displayed on a display of a mobile device associated with the user when a camera of the mobile device is directed at the real-world object associated with the at least one message.

One aspect of the present invention includes a method of communicating audio messages using augmented reality, comprising: analyzing a set of captured messages to determine, for each message of the set of messages, whether the message is relevant to a user; associating at least one message of the set of messages with a real-world object over which to display the at least one message in an augmented reality environment; assigning a time limit to the at least one message based on the analyzed relevance to the user; and displaying, in the case that a current time is within the time limit, the at least one message on a display of a mobile device associated with the user when a camera of the mobile device is directed at the real-world object associated with the at least one message.

Another aspect of the present invention includes a computer system for communicating audio messages using augmented reality, the computer system comprising: a memory medium comprising program instructions; a bus coupled to the memory medium; and a processor, for executing the program instructions, coupled to an augmented reality announcement tool via the bus that when executing the program instructions causes the system to: analyze a set of captured messages to determine, for each message of the set of messages, whether the message is relevant to a user; associate at least one message of the set of messages with a real-world object over which to display the at least one message in an augmented reality environment; assign a time limit to the at least one message based on the analyzed relevance to the user; and display, in the case that a current time is within the time limit, the at least one message on a display of a mobile device associated with the user when a camera of the mobile device is directed at the real-world object associated with the at least one message.

Yet another aspect of the present invention includes a computer program product for communicating audio messages using augmented reality, the computer program product comprising a computer readable storage device, and program instructions stored on the computer readable storage device, to: analyze a set of captured messages to determine, for each message of the set of messages, whether the message is relevant to a user; associate at least one message of the set of messages with a real-world object over which to display the at least one message in an augmented reality environment; assign a time limit to the at least one message based on the analyzed relevance to the user; and display, in the case that a current time is within the time limit, the at least one message on a display of a mobile device associated with the user when a camera of the mobile device is directed at the real-world object associated with the at least one message.

Yet still another aspect of the present invention includes a method for communicating audio messages using augmented reality, comprising: providing a computer infrastructure that includes at least one computer device. The computer device operates to perform the steps of: analyzing a set of captured messages to determine, for each message of the set of messages, whether the message is relevant to a user; associating at least one message of the set of messages with a real-world object over which to display the at least one message in an augmented reality environment; assigning a time limit to the at least one message based on the analyzed relevance to the user; and displaying, in the case that a current time is within the time limit, the at least one message on a display of a mobile device associated with the user when a camera of the mobile device is directed at the real-world object associated with the at least one message.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
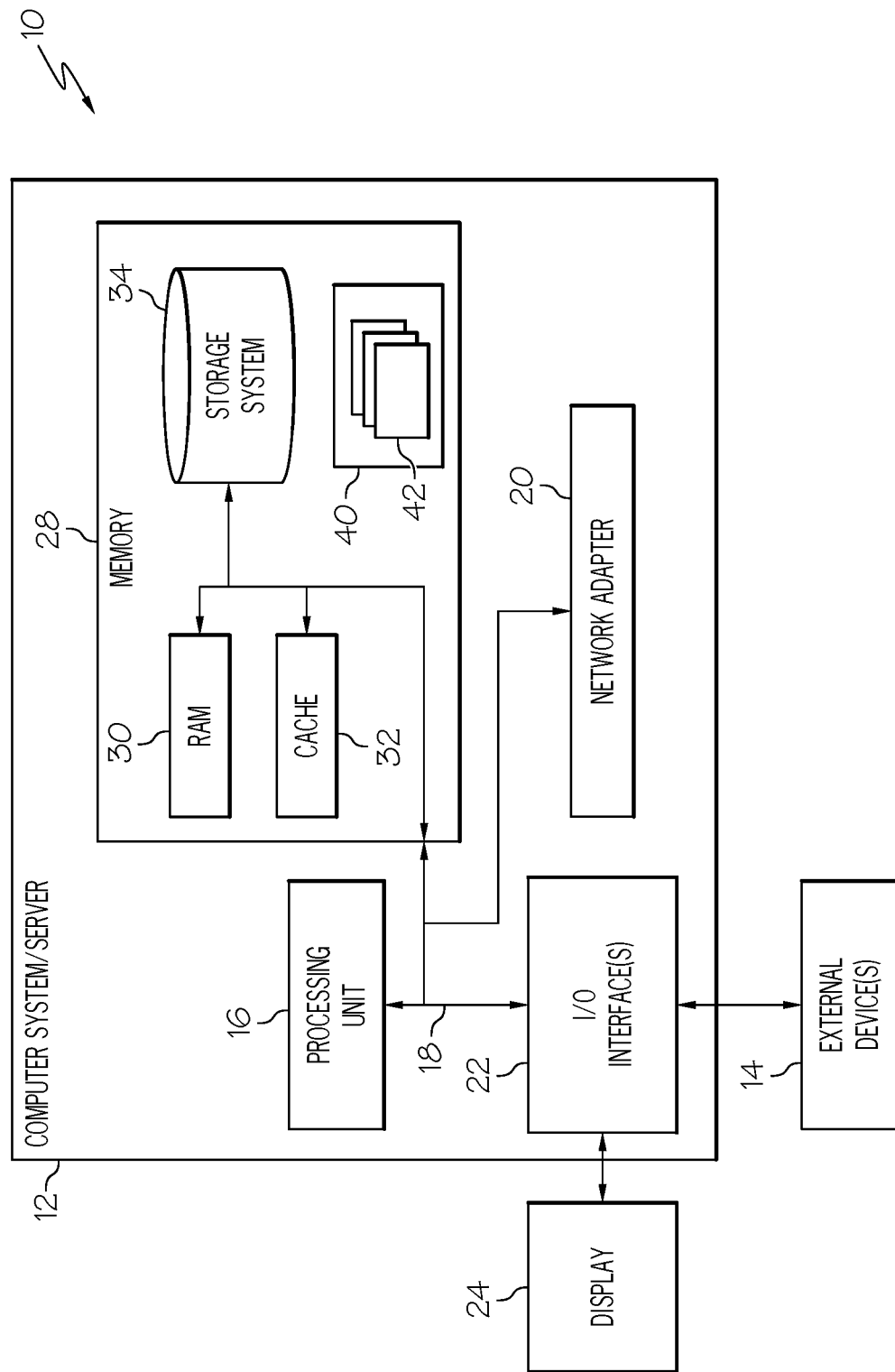
FIG. 1 shows an architecture in which the invention can be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for visualization of audio announcements or messages using augmented reality (AR). Specifically, an audio system captures a set of broadcast audio announcements or messages at an originating location associated with a user as a set of audio files, which a speech-to-text transcriber transcribes to text. A natural language processing tool analyzes the transcribed text to determine, for each announcement, whether the announcement is relevant to the user. Relevant announcements are forwarded to a mobile device of the user. The user may access, in an AR environment, the set of announcements via a set of icons to display text of an announcement or to play audio of an announcement.

The inventors of the present invention have discovered several restrictions of current methods of audio announcements and messages. More specifically, many public areas, including public transportation services, such as a train or bus station, an airport, or a metro, rely on broadcast audio announcements over a speaker system to convey information to a public. However, a user may miss a pertinent announcement for a variety of reasons, such as: being in the wrong location (e.g., a Gate 15 announcement is only made in the vicinity of Gate 15, but the user is at incorrect Gate 51), or being unable to hear the announcement (e.g., an announcement may mask other announcements, music in a terminal may drown out announcements, or a user may be wearing headphones, hard of hearing, or not paying attention). Furthermore, announcements are often broadcast only in a particular vicinity related to the content of the announcement (e.g., a reason for a plane's delay or an expecting boarding time at Gate 1 are only broadcast near Gate 1). Further, some announcement may directly relate to a specific user (e.g., a request for a specific user to come to a specific gate). However, current speaker broadcast systems fail to provide a way to alert a specific user of a specific announcement that is pertinent to them. Current speaker broadcast systems also fail to provide a way for a user to replay or re-hear announcements that have been missed.

The approaches described herein contain numerous advantages over present methods including, but not limited to, visualization of audio announcements and messages using augmented reality (AR). Augmented reality is a live direct or indirect view of a physical, real-world environment whose elements are augmented or supplemented by computer-generated sensory input such as sound, video, graphics, or GPS data. In an AR environment, technology is used to enhance a user's current perception of reality. For example, technologies such as computer vision and object recognition permit information about the surrounding real world of the user to become interactive and be digitally manipulated. Augmentation is conventionally in real-time and in semantic context with environmental elements in which information about the environment and its objects is overlaid on the real world.

Approaches described herein further include presenting a set of announcements, which have been transcribed from audio to text, to a user in an AR environment. This offers the advantage of permitting a user to review prior announcements that the user may have missed. Moreover, approaches presented herein describe applying a natural language analysis to a set of announcements in order to categorize the announcements. A selection of announcements can be presented to a user based on, but not limited to, a relevance of the announcements to the user, a location of the user, or a request of the user. The AR environment further offers the advantage of permitting a user to interact with a visualization of an announcement overlaid in a real environment (e.g., a train station, an airport). This interaction can include providing an identity of an announcement by a category, providing a user with a synopsis of the announcement, and/or providing text or audio of the announcement. Accordingly, a user can determine what announcements have been missed and what announcements the user would like to read or hear repeated.

Referring now to FIG. 1, a computerized implementation 10 of an embodiment for visualization of audio announcements using AR will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can include addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for visualization of audio announcements using AR. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for visualization of audio announcements using AR, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

As discussed further below, embodiments of the present invention provide a method and system for augmenting audio announcements/messages, for example at an airport, bus or train station, or metro, so that a user may see, in an AR environment, which announcements the user has missed, and may replay announcements of interest to the user. In some embodiments, this augmentation occurs in the location where the announcement was made. In further embodiments, a user may be notified of audio announcements that are relevant to the user or the user's current circumstances. In any case, embodiments of the present invention permit a user to, among other things, see announcements the user may have missed and replay them, view the category of missed announcements and a short synopsis thereof, enabling the user to judge if the user would like to replay the announcements, and be notified if an announcement applies to the user's specific situation.

Figure 2:
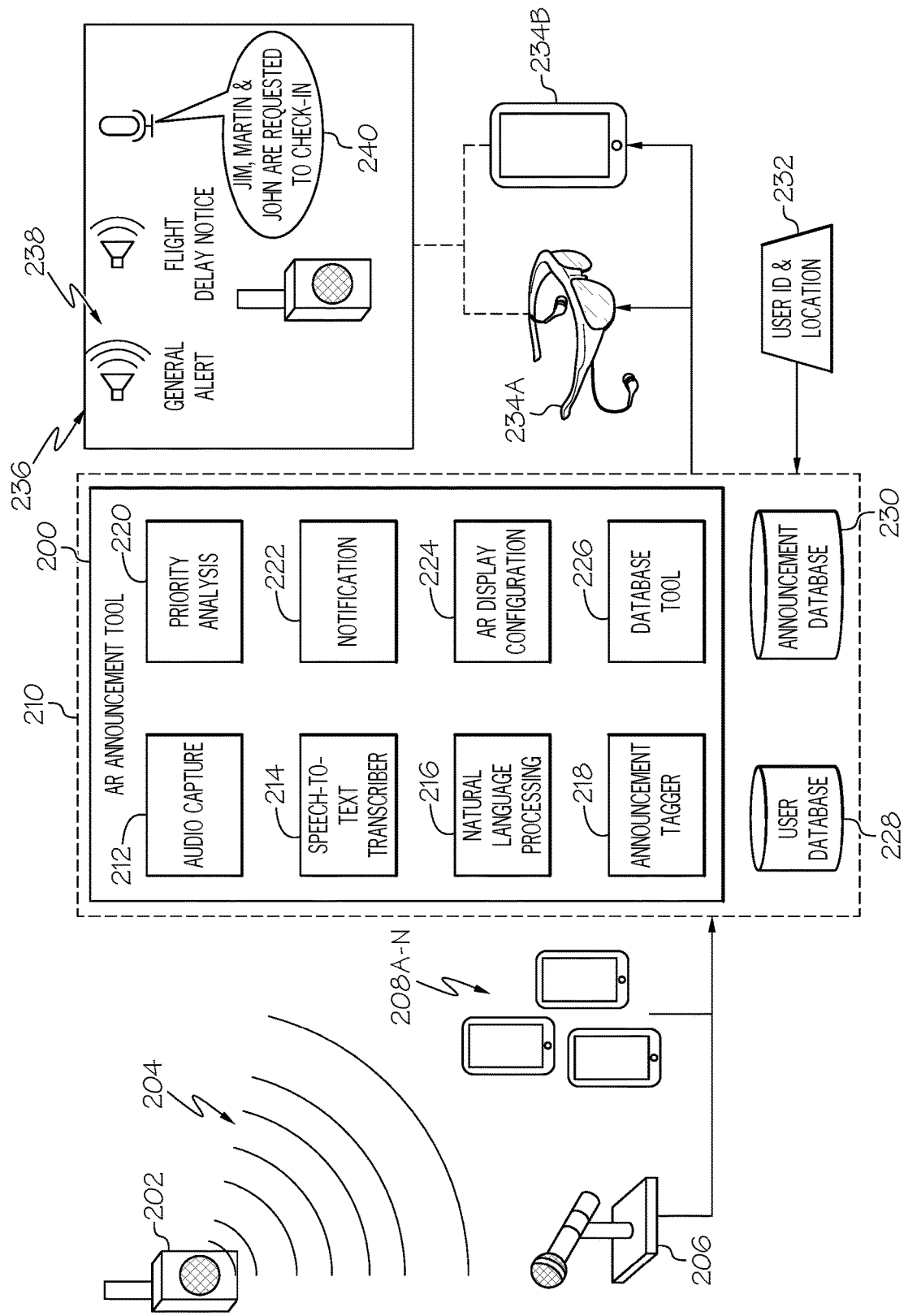
FIG. 2 shows a more detailed system architecture for visualization of audio announcements using augmented reality (AR) according to illustrative embodiments.
Figure 3:
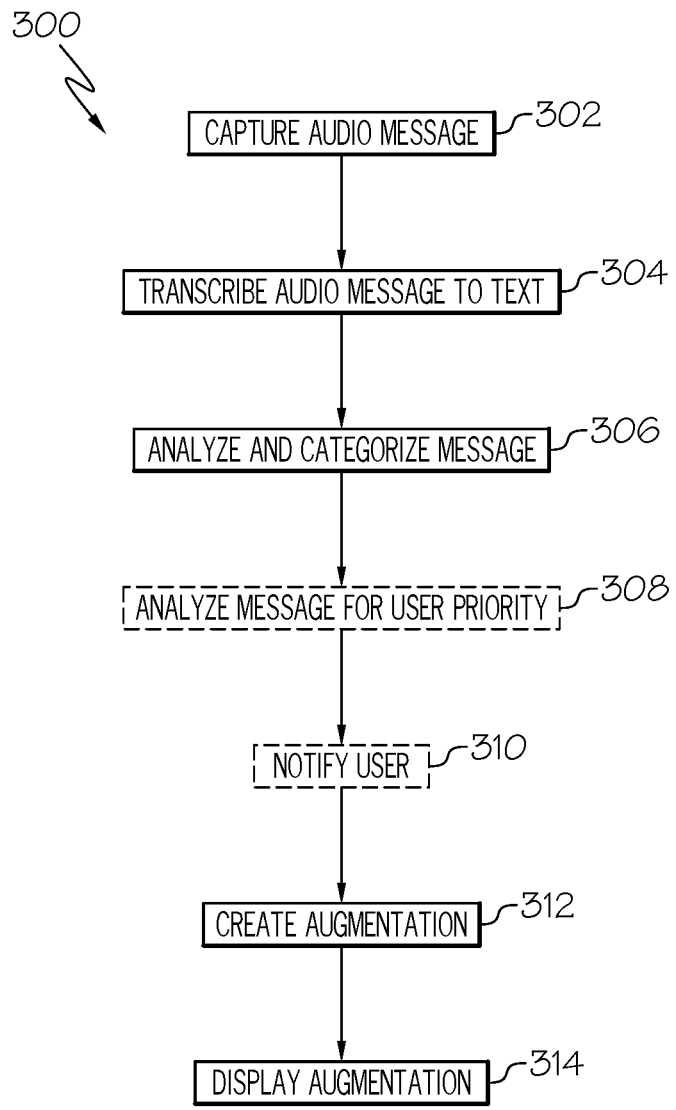
FIG. 3 shows an implementation of an audio announcements visualization process using AR according to illustrative embodiments.

Referring now to FIG. 2 and FIG. 3, a more detailed system architecture and an implementation of an embodiment of the present invention will be shown and described. FIG. 2 shows the more detailed system architecture for visualization of audio announcements and messages using augmented reality (AR) according to illustrative embodiments, while FIG. 3 shows an implementation of an audio announcements visualization process 300 using AR.

In one embodiment of the present invention, audio capture component 212 of AR Announcement Tool 200 captures audio messages or announcements 204 from an announcement source, such as a public announcement (PA) system, a speaker system, or a broadcast speaker 202 for processing at step 302. In some embodiments, this capturing can be performed directly by a PA system, a speaker system, or a broadcast speaker 202 (e.g., by a built-in digital recorder). In a direct capture method, PA/speaker system 202 includes audio capture software. When an audio signal of announcement 204 is broadcast, PA system 202 captures and stores announcement 204 as an audio file. In this method, all announcements can be both captured in an audio file and simultaneously broadcast through PA system 202. This method of direct capture may be suitable for permanent solutions where a PA system can be directly modified, such as in airport terminals.

In other embodiments, a method of indirect capture of audio announcement 204 can be performed in conjunction with embodiments of the present invention. In one embodiment, microphones 206 can be placed or mounted in a vicinity near PA/speaker system 202. These microphones 206 capture announcements 204 as audio files, and can, in some embodiments, note a location of capture in the file using, for example, a metadata tag. This method of indirect capture may be suitable where direct access to PA system 202 is not possible or where PA system 202 is temporary, such as an outdoor concert.

In another embodiment, crowdsourcing can be used to capture announcements or messages. In crowdsourcing, the microphone on a mobile device 208 in a location in which announcements may be broadcast can be enabled to detect and record audio announcements 204. For example, mobile device users can register for a mobile application on a mobile device 208 of a user that utilizes the mobile device 208 to perform this function. In any case, when an announcement is made, mobile device 208 can record the announcement and store it as an audio file or can forward the announcement to a processing location. In some embodiments, mobile device 208 can also note a location of capture and can save the location with the audio file and/or forward the location with the announcement using, for example, a metadata tag. A location of capture can be, for example, determined from a GPS (Global Positioning System) on user mobile device 208 or from location information from a set of beacons (e.g., installed around a public area where announcements are heard) used to pinpoint a user mobile device 208 location. This method of indirect capture may be suitable where a group of participating users wish to capture announcements 204 without direct access to PA system 202.

In any case, PA/speaker system 202, microphones 206, or crowdsourced mobile devices 208A-N can transmit captured announcement/message 204 to central server 210, which receives announcement 204 at augmented reality (AR) announcement tool 200. Central server 210 can include a local server, a remote server, a cloud-based service, or any intermediary type of system.

In some embodiments, audio capture component 212 can further determine a location source of audio announcements 204 and/or a type of recording device used to capture audio announcements 204. For example, audio capture component 212 can determine or select a type of audio announcement 204 feed, such as direct capture from a public announcement (PA) system 202 or indirect capture by a set of system microphones 206 or crowdsourcing devices 208A-N.

In some embodiments, audio capture component 212 can identify recorded sounds as announcement audio and filter announcement audio from other sounds, such as conversations and music. The filter may include speech recognition, frequency recognition, keyword recognition, volume recognition, content recognition, or any other technique now known or later developed for deciphering broadcast audio from surrounding or ambient sounds. A set of recordings captured by crowdsourcing can also be compared by audio capture component 212 to determine what recordings contain announcements and what recordings are other noises. For example, if five different user devices 208 record the same audio speech, the recorded speech is more likely to be an announcement, whereas audio speech recorded by only one of the five devices is more likely to be a private conversation. In other embodiments, audio capture component 212 can check for a sound associated with announcements, such as a "chime" or "ding" when a PA system is engaged and begin recording in response to the engagement sound or, in a case of an ongoing recording, mark the place of the engagement sound in the recording as the beginning of an announcement.

AR announcement tool 200 can further include a speech-to-text transcriber component 214. At step 304, transcriber component 214 analyzes and transcribes a captured audio file of announcement 204 to files containing a text-based transcript of the announcement audio file. In some embodiments, transcriber 214 may employ automatic transcription, such as an automatic transcription service like Dragon transcription (Dragon is a trademark of Nuance Communications Inc.). However, other solutions for converting audio to text that are now known or later developed may also be used. In any case, AR announcement tool 200 can also include a database tool component 226, which stores announcement audio files and/or announcement textual files in an announcement database 230. Database 230 may include, in some embodiments, storage system 34 (FIG. 1), utilizing any solution.

AR announcement tool 200 can further include a natural language processing component 216 and an announcement tagger component 218. At step 306, natural language processing (NLP) component 216 can analyze the transcribed textual file for keywords, names, locations, and other information pertinent to a particular situation using natural language processing (NLP). NLP is the ability of a computer program to understand human speech as it is spoken. NLP component 216 can include any natural language processing technique now known or later developed. In some embodiments, NLP component 216 can analyze announcements 204 to determine if the announcement relates to a particular user (e.g., if a user's name or associated gate are included in the announcement).

Based on the analyzed information from NLP component 216, announcement tagger 218 of AR announcement tool 200 can categorize an announcement/message (e.g., general alert, delay notice, passenger request), create a synopsis describing an announcement (e.g., "do not leave bags unattended"), and/or associate the announcement with a particular location (e.g., Gate 1). For example, announcement tagger 218 can annotate an announcement 204 or announcement transcript with a metadata flag or other tag indicating a category, a synopsis, or a location. Accordingly, in some embodiments, each announcement 204 can have four properties associated with it: announcement content, announcement category, short synopsis of the announcement, and location where the announcement occurred.

AR announcement tool 200 can further include a priority analysis component 220. At optional step 308, priority analysis component 220 can further analyze text of announcement 204 using natural language processing. Priority analysis component 220 determines whether a particular announcement 204 has significant relevance to a given user. For example, in one embodiment, priority analysis component 220 can determine if a user's name appears in announcement 204 by identifying names in announcement 204 and checking them against user database 228. In another embodiment, priority analysis component 220 can flag or assign a high priority or urgency for a particular user to an announcement 204 containing that particular user's name. For example, the announcement: "Jim, Martin, and John are requested to check in at gate 8", would raise a flag of high priority for users Jim, Martin, and John. In another embodiment, priority analysis component 220 can determine if an announcement directly relates to the user. For example, priority analysis component 220 can determine if an announcement describes a change in travel plans and search user database 228 for any users with travel itineraries affected by the change and flag or assign a high priority for a particular user to that announcement.

In another embodiment, AR announcement tool 200 can send a text transcript of an announcement/message 204 made in a general vicinity of a user to a user's mobile device 234 for further analysis. A natural language processing component stored on mobile device 234 of the user can analyze the relevance of announcement 204 to the given user. In one embodiment, if the natural language processing component of user device 234 determines that the user's name appears in the announcement or the announcement directly relates to the user (e.g., the announcement contains keywords related to the user's travel plans or itinerary stored in the mobile device), then the announcement will be flagged or marked as high priority. For example, if a user is scheduled on Flight AA1 and the announcement reads "Flight AA1 has changed gates", the announcement will be flagged as important.

In some embodiments, priority analysis component 220 or natural language processing component 216 (e.g., stored on server 210 or stored on mobile user device 234) can assign a priority score to an announcement. The priority score can be based on a determined importance of an announcement 204, and can be weighted based on factors such as, but not limited to, a name of a user in the announcement, a location associated with a user (e.g., a location of the user or a location entered by a user, such as a user's destination gate), a name of a flight/bus/train a user is scheduled to travel on, an event associated with the user (e.g., a final boarding call for a flight of a user), and a set of keywords. Moreover, in some examples, announcement 204 can be rated on a scale (e.g., of 1-10) of importance or assigned a percent relevance to a user. A priority score can be based on keywords as well as situational words. For example, for a passenger on flight AA1, the announcement "Flight AA1 has a gate change" is flagged with a high priority score, while "Welcome passengers of flight AA1, we will begin the boarding process shortly" is assigned a lower priority score.

AR announcement tool 200 can further include a notification component 222. In some embodiments, at optional step 310, notification component 222 transmits a notification or alert associated with a flagged or priority announcement to a device 234 of a user based on the above-described analysis. Notifications can take the form of a text message (SMS), an email, or an in-app notification. In still other embodiments, this announcement can appear in augmented reality display/overlay 236 (described in further detail below) in forms such as, but not limited to, a pop-up, an alert icon, or a blinking icon. In some embodiments, a notification component can be stored on a user device 234 and can display a notification on user device 234, such as in-application. A notification type can be based on a priority score of announcement 204, such as a high priority announcement containing a particular user's name. For example, a high priority announcement of relevance to a user may be displayed to the user immediately (e.g., by text message or a pop-up), whereas a lower priority announcement of relevance to the user may be presented to the user as an augmented announcement icon with an alert indicator (e.g., blinking, a bright color) to denote that the announcement is relevant to the user when the user looks at it. In further embodiments, notification component 222 can select which mobile devices would be most appropriate to send the notification to, for example based on a closeness or distance of a mobile device to the vicinity of an announcement.

In further embodiments, a user may set an originating announcement location for notifications to user device 234. For example, a user may select a location from where announcements are made (e.g., announcements made from Gate 3) and select to have these announcements forwarded by notification, as described above, to device 234 of the user. These announcements, for example in the form of a textual transcript, can then be pushed to device 234 of the user in real-time. Accordingly, a user can set an announcement originating location and then receive any announcements made at that location on a mobile device, even when the user is located elsewhere (e.g., in a restaurant, a washroom, a shop, etc.). In still further embodiments, notification component 222 can select a set of locations to associate with a user, based on, for example: a location of user device 234 or a travel plan of the user, such as an itinerary including departure gates/terminals, travel routes, and transportation means.

For example, if a user's itinerary says that the user will depart from Gate 5 at Terminal C, walking through Terminal B, then notification component 222 can associate the user with Gate 5, Terminal C, and Terminal B and can push to user device 234 announcements made from or about Gate 5 and general announcements made from or about Terminals B and C. Continuing this example, if location information from user device 234 indicates that the user is in Terminal B and an announcement is made indicating that an escalator connecting Terminal B to Terminal C is closed for maintenance, then, once priority analysis component 220 has determined that the announcement is of high importance to the user because a travel route of the user is affected, notification component 222 can push a notification of this announcement to user device 234.

AR announcement tool 200 can further include an augmented reality (AR) display configuration component 224. At step 312, AR display configuration component 224 creates an augmented reality (AR) overlay/display 236 for a user device 234 to augment announcements 204. A user device 234 can include, but is not limited to: a mobile phone, such as a smart phone; a mobile device, such as a tablet; or a mobile head-mounted display, such as smart glasses, etc.

AR display configuration component 224 can create an AR overlay 236 that associates a user with a physical location at which the user is pointing a camera of a user device 234. In one embodiment, AR display configuration component 224 can create an AR view showing past and current announcements at a place of origin of the announcements (e.g., a broadcast speaker, a gate desk). For example, a user could look at a broadcast speaker 202, in an AR environment provided by a user device 234 with AR capabilities, and see icons 238 showing, for instance, the past three announcements 204 from that broadcast speaker 202. A user can view the AR overlay 236 by viewing that particular physical location via a display screen of user device 234, such as head mounted display device 234A or mobile device 234B.

AR announcement tool 200 can determine a location of a user or user device 234 by any method now known or later discovered. In one embodiment, server 210 can receive location information from a GPS (Global Positioning System) on user device 234. In another embodiment, server 210 can receive location information from a set of beacons (e.g., installed around a public area subject to announcements) used to pinpoint a user device location. In still yet another embodiment, server 210 can receive images from user device 234 and through object recognition, determine a location and area view of user device 234. This location can be used to set the announcement location from which the user wishes to receive announcements and/or to indicate that the user has moved from the announcement location and that AR announcement tool 200 should forward announcements to the user.

In some embodiments, AR display configuration component 224 of AR announcement tool 200 can determine what locations are most appropriate to display an announcement in an augmented reality based on a content of the announcement. In further embodiments, AR display configuration component 224 can remove some announcements from the AR display after a predetermined time has passed in order to prevent announcements from becoming stale. In still other embodiments, AR display configuration component 224 can condense or remove redundant announcements.

In one embodiment, AR display/overlay 236 can display an icon 238 for announcement 204 indicating a category of announcement 204 along with a short summary 240 of announcement 204. Users can activate icons 238 to play back announcements the user may have missed and/or to view a text of the announcements 204. In some embodiments, augmentation occurs at a source of announcement 204 or a place related to the announcement (e.g., an announcement relating to a gate change may appear at both the original gate and the new gate).

In some further embodiments, AR display configuration component 224 can configure AR overlay 236 to a particular user. This AR overlay can be based on a particular ID or location of a user 232. For example, a user looking at a physical broadcast announcement speaker via a display screen of a user device 234 can be permitted to view announcements relevant to the user previously made at that broadcast speaker in AR overlay 236 over the broadcast speaker. In another example, a user identified as departing from Gate 1 may be permitted to view announcements relating to Gate 1, but not Gate 2, in the augmented reality.

In further embodiments, AR display configuration component 224 can configure an AR overlay based on information retrieved from user database 228. For example, user database 228 can contain information such as, but not limited to, a user name, a user's destination, a user's flight/bus/train travel plan or itinerary, a set of gates/terminals/platforms to which a user is assigned, a user's membership in a rewards group (e.g., a platinum membership), and so on. In some embodiments, user database 228 can be populated with information from users who have registered for an augmented reality (AR) service, for example through an application on user device 234. In some embodiments, a user may provide information to an on-device application such as a user name, a user's destination, a user's flight/bus/train travel plan/itinerary, a set of gates/terminals/platforms to which a user is assigned, a user's membership in a rewards group, and so on.

In some embodiments, a user can select what types of announcements and what forms of AR are presented on mobile user device 234 (e.g., by configuring an application stored on mobile user device 234). In one embodiment, a user may opt-in to receiving high priority announcements and notifications in an augmented reality environment, but decline viewing general announcements in the augmented reality environment. In another embodiment, a user may choose to receive announcements in the AR environment as icons, or as a list of announcement synopses. In any case, a user may be presented with a setting on a mobile device to select what kinds of announcements the user is interested in and how those announcements are to be treated.

At step 314, AR display configuration component 224 transmits AR overlay/display 236 to user device 234 for display. This transfer can, for example, be in response to a request from a user or a device of a user for augmented reality (AR) information. In another example, the transfer can be in response to an activation of an augmented capability of user device 234 when a user opens an augmented reality (AR) application on device 234 and points device 234 to look at something. At user device 234, AR overlay/display 236 is displayed on a display surface of device 234. In one embodiment, a user device 234 can be a wearable device such as smart glasses. Smart glasses and similar wearables may contain a head mounted display through which a user can see a real environment and view an AR overlay projected on the display over the real environment. The AR overlay can be displayed as augmented announcement icons 238 over a location at which the user is looking. In another embodiment, a user device 234 can be a mobile device with a camera and display screen, such as a smartphone. A mobile device can display augmented announcement icons 238 in the mobile device display over a live feed from the mobile device camera. In one embodiment, AR display configuration component 224 can configure announcement icons 238 to be placed or associated with their source, for example, over a broadcast speaker 202 from where the announcement came. In another embodiment, AR display configuration component 224 can place announcement icons 238 in a logical location related to a content of the announcement, for example over a boarding gate at an airport.

It can be appreciated that the approaches disclosed herein can be used within any computer system (e.g., server 210) for visualization of audio announcements and messages using AR, as shown in FIG. 1 (e.g., computer system 12). In this case, AR announcement tool 200 can be provided, and one or more computerized systems for performing the processes described in embodiments of the invention can be obtained and deployed to computer system 12. To this extent, the deployment can include one or more of: (1) installing program code on a computing device, such as a computer system, from a computer-readable medium or device; (2) adding one or more computing devices to the infrastructure; and (3) incorporating and/or modifying one or more existing systems of the computer system to enable the computer system to perform the process actions of embodiments of the invention. In some embodiments, AR announcement tool 200 can be provided as a program modules 42 stored in memory 28 (FIG. 1). Any of audio announcement 204, text of audio announcement 204, and user information may be stored in storage system 34, also stored in memory 28.

In some embodiments, it may be desirable to deploy AR announcement tool 200 locally to prevent time delays between a request by a user and a system response. However, embodiments of the present invention may also be deployed, for example, as a cloud-based service or as any intermediary type of system.

Figure 4:
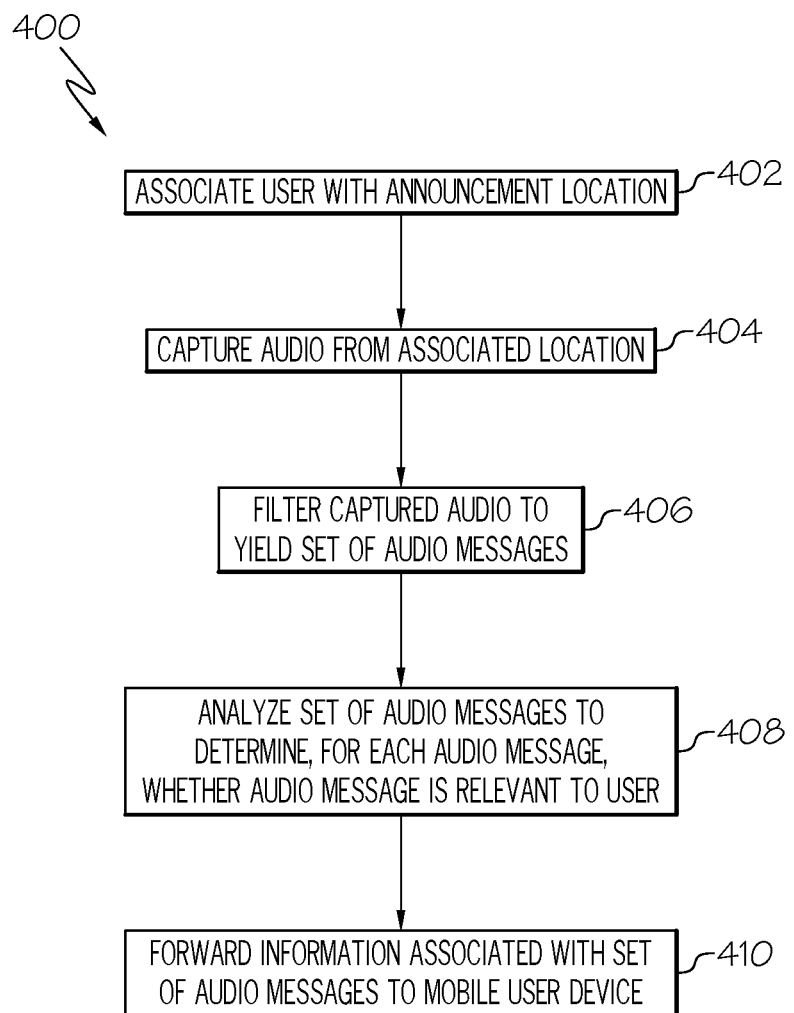
FIG. 4 shows a process flowchart for visualization of audio announcements using AR according to illustrative embodiments.

As depicted in FIG. 4, in one embodiment, a system (e.g., computer system 12) carries out the methodologies disclosed herein. Shown is a process flowchart 400 for visualizing audio messages using augmented reality. At step 402, a user is associated with an announcement location, the association being based on personal information associated with a user. At step 404, audio is captured from the associated location. At step 406, the captured audio is filter to yield a set of audio messages. At step 408, the set of audio messages are analyzed to determine, for each audio message of the set of audio messages, whether the audio message is relevant to the user. At step 410, information associated with the set of audio messages is forwarded to the mobile user device.

Process flowchart 400 of FIG. 4 illustrates the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit including custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, include one or more physical or logical blocks of computer instructions, which may, for instance, be organized as an object, procedure, or function. Nevertheless, the executables of an identified system or unit need not be physically located together, but may include disparate instructions stored in different locations which, when joined logically together, include the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for visualization of audio announcements using augmented reality (AR) Thus, embodiments herein disclose a process for supporting computer infrastructure, including integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for visualization of audio announcements using AR. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands including words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device, such as a hardware storage device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to visualizing audio announcements using augmented reality. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method of communicating audio messages using augmented reality, comprising:

analyzing a set of captured messages to determine, for each message of the set of messages, whether the message is relevant to a user;

associating at least one message of the set of messages with a real-world object, based on an analyzed content of the at least one message, over which to display the at least one message in an augmented reality environment;

reconfiguring the at least one message from a first format to a second format capable of being displayed as an augmented reality overlay on a display of a camera view of a mobile user device having a camera;

assigning a time limit to the at least one message based on the analyzed relevance to the user;

forwarding the at least one message to a mobile user device associated with the user in real-time, responsive to the reconfiguration of the at least one message; and displaying, in the case that a current time is within the time limit, the at least one message on a display of the mobile device associated with the user when a camera of the mobile device is directed at the real-world object associated with the at least one message.

2. The method of claim 1, the displaying the at least one message further comprising:

associating the at least one message with a set of icons in an augmented reality environment; and displaying the set of icons over the real-world object.

3. The method of claim 1, wherein the relevance to the user is based on at least one item selected from the group consisting of: a location of the mobile device, a travel plan of the user, and a selection by the user of a location.

4. The method of claim 1, the method further comprising receiving an electronic audio file of the at least one message from an announcement broadcast system or a set of microphones positioned near a broadcast speaker of an announcement broadcast system.

5. The method of claim 1, the method further comprising receiving an audio file of the at least one message from a plurality of crowd-sourced mobile devices, the plurality of crowd-sourced mobile devices each having a microphone and being configured to record, save, and transmit an audio file.

6. The method of claim 1, the analyzing further comprising:
applying natural language processing to a text of each message of the set of messages, the natural language processing being based on a set of keywords, the set of keywords selected from a group consisting of: a set of names, a set of locations, and a set of situational terms; and
marking a message of the set of messages as relevant to a user in the case that the natural language processing detects text in the message selected from the group consisting of: a name of the user, a location associated with the user, a transportation vehicle associated with the user, and a set of keywords associated with the user.

7. The method of claim 1, the method further comprising forwarding a notification to the user, the notification selected from the group consisting of: a text message, an email, an in-application notification, and an augmented reality notification.

8. The method of claim 1, the analyzing further comprising:
determining whether a message of the set of messages includes a change to a schedule;
searching a user database to determine if an itinerary of the user is affected by the change to the schedule; and
flagging the message as relevant to the user in the case that the change to the schedule affects the itinerary of the user.

9. The method of claim 1, the method further comprising:
assigning a priority score to each message of the set of messages; and
forwarding the at least one message to the mobile device associated with the user in a notification format corresponding to the priority score assigned to the at least one message.

10. A computer system for communicating audio messages using augmented reality, the computer system comprising:
a memory medium comprising program instructions;
a bus coupled to the memory medium; and
a processor, for executing the program instructions, coupled to an augmented reality announcement tool via the bus that when executing the program instructions causes the system to:
analyze a set of captured messages to determine, for each message of the set of messages, whether the message is relevant to a user;
associate at least one message of the set of messages with a real-world object, based on an analyzed content of the at least one message, over which to display the at least one message in an augmented reality environment;
reconfigure the at least one message from a first format to a second format capable of being displayed as an augmented reality overlay on a display of a camera view of a mobile user device having a camera;
assign a time limit to the at least one message based on the analyzed relevance to the user;
forward the at least one message to a mobile user device associated with the user in real-time, responsive to the reconfiguration of the at least one message; and
display, in the case that a current time is within the time limit, the at least one message on a display of the mobile device associated with the user when a camera of the mobile device is directed at the real-world object associated with the at least one message.

11. The computer system of claim 10, the instructions further causing the system to:
associate the at least one message with a set of icons in an augmented reality environment; and
display the set of icons over the real-world object.

12. The computer system of claim 10, wherein the relevance to the user is based on at least one item selected from the group consisting of: a location of the mobile device, a travel plan of the user, and a selection by the user of a location.

13. The computer system of claim 10, the instructions further causing the system to receive an electronic audio file of the at least one message from an announcement broadcast system or a set of microphones positioned near a broadcast speaker of an announcement broadcast system.

14. The computer system of claim 10, the instructions further causing the system to receive an audio file of the at least one message from a plurality of crowd-sourced mobile devices, the plurality of crowd-sourced mobile devices each having a microphone and being configured to record, save, and transmit an audio file.

15. The computer system of claim 10, the instructions further causing the system to:
apply natural language processing to a text of each message of the set of messages, the natural language processing being based on a set of keywords, the set of keywords selected from a group consisting of: a set of names, a set of locations, and a set of situational terms; and
mark a message of the set of messages as relevant to a user in the case that the natural language processing detects text in the message selected from the group consisting of: a name of the user, a location associated with the user, a transportation vehicle associated with the user, and a set of keywords associated with the user.

16. The computer system of claim 10, the instructions further causing the system to forward a notification to the user, the notification selected from the group consisting of: a text message, an email, an in-application notification, and an augmented reality notification.

17. The computer system of claim 10, the instructions further causing the system to:
determine whether a message of the set of messages includes a change to a schedule;
search a user database to determine if an itinerary of the user is affected by the change to the schedule; and
flag the message as relevant to the user in the case that the change to the schedule affects the itinerary of the user.

18. The computer system of claim 10, the instructions further causing the system to:
assign a priority score to each message of the set of messages; and
forward the at least one message to the mobile device associated with the user in a notification format corresponding to the priority score assigned to the at least one message.

19. A computer program product for communicating audio messages using augmented reality, the computer program product comprising a computer readable storage device, and program instructions stored on the computer readable storage device, to:
analyze a set of captured messages to determine, for each message of the set of messages, whether the message is relevant to a user;
associate at least one message of the set of messages with a real-world object, based on an analyzed content of the at least one message, over which to display the at least one message in an augmented reality environment;
reconfigure the at least one message from a first format to a second format capable of being displayed as an augmented reality overlay on a display of a camera view of a mobile user device having a camera;
assign a time limit to the at least one message based on the analyzed relevance to the user;
forward the at least one message to a mobile user device associated with the user in real-time, responsive to the reconfiguration of the at least one message; and
display, in the case that a current time is within the time limit, the at least one message on a display of the mobile device associated with the user when a camera of the mobile device is directed at the real-world object associated with the at least one message.

20. The computer program product of claim 19, the computer readable storage device further comprising instructions to:
associate the at least one message with a set of icons in an augmented reality environment; and
display the set of icons over the real-world object.

* * * * *